United States Patent [19]

Stevenson

[11] Patent Number: 5,482,512
[45] Date of Patent: Jan. 9, 1996

[54] ELECTRO-MECHANICAL HYBRID POWERTRAIN WITH SELF-ENGAGING BRAKES FOR STARTING THE ENGINE

[75] Inventor: Paul D. Stevenson, Ann Arbor, Mich.

[73] Assignee: General Motors Corporation, Detroit, Mich.

[21] Appl. No.: 226,602

[22] Filed: Apr. 12, 1994

[51] Int. Cl.⁶ ............................. F16H 37/00; B60L 11/14
[52] U.S. Cl. .................. 475/5; 475/269; 74/661; 188/70 B
[58] Field of Search ............................. 475/2, 5, 8, 269, 475/271; 477/3, 4; 192/4 R, 7; 74/661; 180/65.2; 188/70 R, 70 B, 187

[56] References Cited

U.S. PATENT DOCUMENTS

| | | | |
|---|---|---|---|
| 2,344,933 | 3/1944 | Lambert | 188/70 B |
| 2,693,722 | 11/1954 | Winther | 475/269 X |
| 2,856,989 | 10/1958 | Burnett et al. | 188/70 B |
| 3,323,779 | 6/1967 | Burnett | 192/4 R |
| 5,258,651 | 11/1993 | Sherman | 180/65.2 X |
| 5,285,111 | 2/1994 | Sherman | 180/65.2 X |

*Primary Examiner*—Khoi Q. Ta
*Attorney, Agent, or Firm*—Donald F. Scherer

[57] ABSTRACT

An electro-mechanical hybrid powertrain uses the electric motor during engine starting. A planetary gear arrangement is disposed in torque transmitting relation between the prime mover, the electric motor and the transmission output. A pair of brake members, which are self-engaging, are provided to establish reaction members in the planetary gear arrangement during engine starting. A fluid-operated piston selectively enforces disengagement of the brakes after the engine has started.

4 Claims, 1 Drawing Sheet

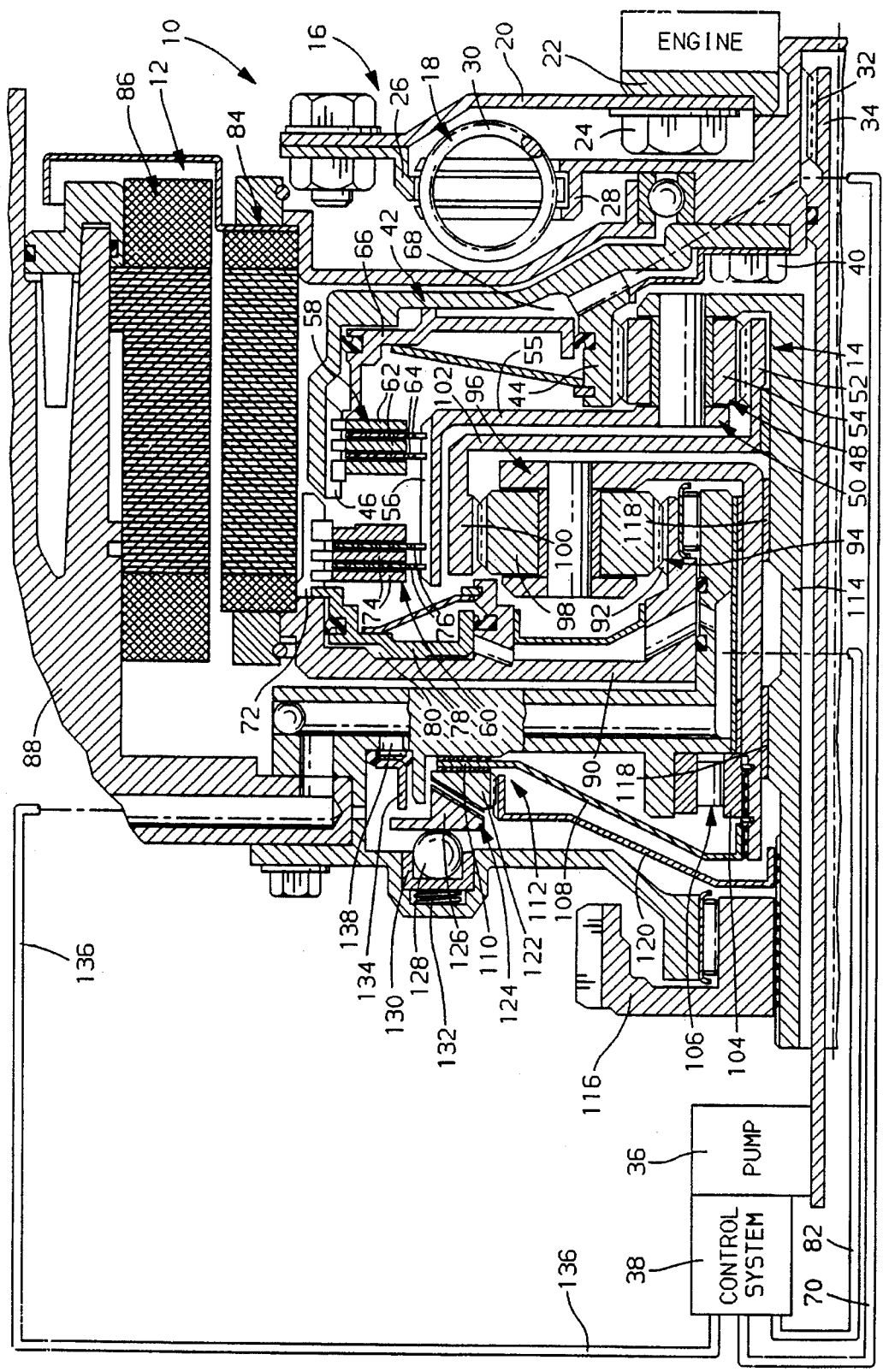

ELECTRO-MECHANICAL HYBRID POWERTRAIN WITH SELF-ENGAGING BRAKES FOR STARTING THE ENGINE

TECHNICAL FIELD

This invention relates to electro-mechanical powertrains, and more particularly, to such powertrains utilizing the electric drive during engine starting.

BACKGROUND OF THE INVENTION

Hybrid electro-mechanical powertrains have an electric motor and a prime mover, generally an internal combustion engine, interconnected through a planetary gear arrangement to a power output. The electric motor can be used to provide a starting motor for the prime mover. To accomplish this, a reaction mechanism must be provided for the planetary gear arrangement which will hold at least the power output stationary. As a general rule, a hydraulically actuated or manually actuated device (brake) has been provided to establish this reaction. These devices require hydraulic power which is generated by an electrically driven pump or a manually actuated linkage.

With the hydraulic drives, battery power is required for both the starter motor and the pump during these operations. The manual linkage system requires an interconnection between the operator and the transmission to permit the selection of the brake application.

SUMMARY OF THE INVENTION

To promote a simpler and more efficient system, self-energizing or self-engaging brakes are provided in the hybrid electro-mechanical transmission to establish reaction members in the planetary gear arrangement. These brakes will automatically be engaged when the electric motor is operated to start the prime mover. The brakes are disengaged by a single piston which is pressurized by a conventional prime mover driven hydraulic pump and a control.

The planetary arrangement provided has two reaction members, one of which is connected to the power output. These reaction members, if free, will rotate in opposite directions during the starting procedure of the prime mover. The fact that the opposite rotation directions are available, reduces the reaction torque that must be absorbed by the self-engaging interface and minimizes the disengaging pressure required at the piston.

It is therefore an object of this invention to provide an improved hybrid powertrain, wherein self-energizing brake means are provided to establish a reaction for a planetary gear arrangement disposed in the hybrid powertrain.

It is another object of this invention to provide an improved hybrid powertrain, as set forth above, wherein a single fluid operated piston is disposed to selectively disengage the self-engaging brake means.

It is yet another object of this invention to provide an improved hybrid powertrain, as set forth in aforementioned objects, wherein a single fluid operated piston enforces substantially simultaneous disengagement of two self-actuating brakes.

These and other objects and advantages of the present invention will be more apparent from the following description and drawings.

DESCRIPTION OF THE DRAWING

A single drawing is presented which gives a diagrammatic cross-sectional representation of a hybrid power transmission incorporating the present invention.

DESCRIPTION OF AN EXEMPLARY EMBODIMENT

An electro-mechanical hybrid powertrain 10 includes a motor-generator 12, a pair of planetary gear sets 14 and an engine input assembly 16. The engine input assembly 16 is comprised of a conventional spring and friction damper 18 and a conventional flex plate 20 which is adapted to be connected to an engine output or crankshaft 22 by a plurality of fasteners 24.

The damper 18 includes an input hub 26, an output hub 28 and a plurality of spring members 30 disposed therebetween to transmit substantially transient torque free power from the engine through the flex plate 20 to the output hub 28. The output hub 28 is connected at a spline 32 to a control pump shaft 34 which is operative to drive a conventional hydraulic pump 36 to supply fluid power to a conventional electro-mechanical control system 38.

The output hub 28 is also connected by fasteners 40 to a planetary input hub 42 which integrally incorporates a ring gear 44 and a clutch input member 46. The ring gear 44 is a member of a first planetary gear set 48 which also includes a conventional planet carrier 50 and a sun gear 52. A plurality of pinion gears 54 are rotatably supported on the carrier 50 and disposed in meshing relationship with the ring gear 44 and the sun gear 52.

The carrier 50 has a hub portion 55 which provides a clutch spline portion 56 for a pair of fluid operated friction clutches 58 and 60. The fluid operated friction clutches 58 and 60 are conventional fluid operated friction type clutches.

The clutch 58 has a plurality of friction plates or discs 62 drivingly connected to the hub 42 and a plurality of interlaced friction discs 64 splined to the hub portion 56 and adapted to frictionally engage the plates 62 when a fluid operated piston 66 is pressurized at a chamber 68 to enforce the engagement thereof. The fluid operated piston 66 receives fluid pressure in the chamber 68 from the control 38 through a clutch engaging passage 70.

The clutch 60 has an input hub 72 to which is drivingly connected a plurality of friction discs 74. Interspersed with the friction discs 74 is a plurality of friction discs 76 which are splined at the spline 56. The clutch 60 is controlled by a conventional fluid operated piston 78 which is engaged or activated by fluid pressure in a chamber 80 which receives fluid via passage 82 from the control 38. The hub 72 of clutch 60 is secured to rotor 84 of the motor-generator 12. The motor-generator 12 also has a stator portion 86 which is secured to a transmission housing 88.

The rotor 84 is also connected through a hub 90 to a sun gear 92 which is a member of a planetary gear set 94. The planetary gear sets 94 and 48 make up the planetary arrangement 14. The planetary gear set 94 also includes a planet carrier 96 on which is rotatably supported a plurality of pinion gears 98 meshing with the sun gear 92 and a ring gear 100. The ring gear 100 is connected via a hub 102 with the sun gear 52. Thus, the planetary gear sets 48 and 94 are interconnected.

The carrier 96 of the planetary gear set 94 is drivingly connected to an inner race 104 of a one-way brake member 106 and through a hub 108 to a friction plate 110 of a disc brake 112. The carrier 50 of planetary gear set 48 is drivingly connected to a transmission or power output shaft 114, which in turn is splined to a gear or sprocket 116. The carrier 96 is rotatably supported on the shaft 114 by a pair of bushings 118.

The shaft 114 also has splined thereto a hub 120, which in turn is splined to a member 122 of a cone brake 124. The cone brake 124 also includes another member 126 which is disposed in abutting relation with a plurality of ball members 128 supported in a ramp or cam housing 130 which is urged to engage the balls 128 with the member 126 by a plurality of springs 132.

The member 126 is also operatively connected with a fluid operated piston 134, which in turn is in fluid communication with a passage 136 disposed between the control 38 and a clutch operating chamber 138. Fluid pressure in the passage 136 will urge the piston 134 to move leftward thereby forcing the member 126 of cone brake 124 to move leftward.

The hybrid powertrain 10 is similar to the hybrid powertrain disclosed in U.S. Pat. No. 5,285,111, issued Feb. 8, 1994, assigned to the assignee of the present invention. The selective energization of clutches 58 and 60 permit various drive paths between the engine, the motor-generator 12 and the shaft 114. A review of the above-mentioned U.S. Pat. No. 5,285,111 will provide the reader with a more complete determination of the operation of the hybrid powertrain 10. Also, the one-way brake member 106 is effective during normal operation of the hybrid powertrain 10.

As a brief description of the operation during vehicle launch, the one-way brake 106 and/or the rotating inertia of the rotor 84 are effectively combined through the planetary gear set 14 to promote torque transmission between the engine and the sprocket 116. During operation after vehicle launch, the energization of clutch 60 will permit electrical power to be effectively combined with engine power to drive the sprocket 116. A further driving mode is provided when both clutches 60 and 58 are engaged to establish a one-to-one drive connection in the planetary gear set 14, such that both engine power and electrical power are delivered to the sprocket 116.

The primary difference between the prior art and the present invention is the use of self-energizing disc brake 112 and self-energizing cone brake 124 to permit the motor-generator 12 to provide starting power to the engine.

When the engine is unpowered and the motor-generator 12 is driven such that the rotor 84 will rotate in the direction necessary to provide engine rotation for starting, the balls 128 will be urged into abutment with the member 126 such that the cone brake 124 and the disc brake 112 will provide a frictional drag between their respective hubs 120 and 108. The respective drive between these hubs will cause rotation of the members and will result in the balls 128 being propelled in the cam housing 130 along ramps, not shown, to further enforce engagement of the cone brake 124 and disc brake 112. Thus, the carrier 96 and carrier 50 will become the reaction members since both will be held stationary by their respective brakes 124 and 112.

When viewed from left to right along the shaft 114, it is presumed the engine will be turned clockwise for starting and during normal operation. To accomplish this, the rotor 84 is also rotated clockwise. Clockwise rotation of the rotor 84 will result in the clockwise rotation of sun gear 92 which will enforce counterclockwise rotation of the ring gear 100 due to the carrier 96 being held stationary by the disc brake 112. The ring gear 100, and therefore sun gear 52, in rotating counterclockwise will enforce clockwise rotation of the ring gear 44 since the carrier 50 is maintained stationary by the disc brake 124.

It should be appreciated that the torque imposed on the carrier 96 is in a clockwise direction and the torque imposed on the carrier 50 is in a counterclockwise direction. Thus, the frictional force of the disc brake 112 is opposite to the frictional force of the cone brake 124, such that the self-energizing assembly represented by the ball 128, springs 132 and cam housing 130 is only necessary to react against the difference in the torque levels at these two brakes. This greatly reduces the force to ground necessary to provide the self-energizing operation of the brakes 112 and 124.

When the engine has started and is providing power to the transmission, the pump 36 will be driven via the shaft 34, such that hydraulic control pressure is available at the control 38. The control 38 is manipulated to control fluid pressure to the passage 136 and therefore chamber 138. The fluid pressure in this passage will enforce axial movement of the piston 134 which will result in leftward movement of the member 126 and therefore disengagement of the cone brake 124 and the disc brake 112.

It should also be appreciated that the force necessary to release the brakes is equal to the difference in the torque being transmitted thereby. Thus, the disengagement pressure of the brakes 124 and 112 is not excessively high.

The fluid pressure in passage 136 is supplied by the control 38 and can be generated as a result of an engine speed signal, an engine torque availability signal, a centrifugal signal of any of the rotating components within the transmission, or simply as a result of the pump 36 being rotated sufficiently fast to provide fluid pressure to the system. The fluid pressure in passages 70 and 82, when enforce engagement of the clutches 58 and 60, respectively, is also supplied by a conventional control philosophy.

The control of the pressure levels to be supplied can be established by electrical devices, such as pulse width modulated solenoids or linear pressure actuators, or by more conventional spring and valve arrangements. These methods of pressure control and distribution are well known, such that it is believed that those skilled in the art will readily recognize the various methods which can be employed to supplied the fluid pressure required.

What is most important to be viewed here, is that the brakes 112 and 124 are self-energizing, thus relieving the need for any power consumption by the pump 36 and/or the control 38 during engine starting, thereby keeping the battery starting power requirement to a minimum.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. In combination an electro-mechanical hybrid powertrain comprising:

an input means for supplying power;

an electric motor/generator;

planetary gear means disposed between and interconnecting the input means and the motor/generator comprising at least two planetary gear sets including a first member operatively connected with the input means, a second member operatively connected with the motor/generator and a third member; and brake means for providing a reaction in said planetary gear means for permitting said motor/generator to drive said input means during a starting sequence, said brake means comprising self-energizing means operatively connected with said third member of said planetary gear means for engaging said brake means in response to torque being imposed on one member of the planetary gear means and fluid operated piston means for de-activating said self-energizing means for selectively disengaging said brake means.

2. The combination of an electro-mechanical hybrid powertrain defined in claim 1, wherein said planetary gear means further includes a fourth member drivingly connected with said first member a fifth member drivingly connected with said input means and a sixth member drivingly connected with an output member of the electro-mechanical hybrid powertrain.

3. The combination of an electro-mechanical hybrid powertrain defined in claim 2, wherein said first member is a planetary ring gear, said second member is a planetary sun gear, and said third member is a planetary carrier assembly upon which torque is imposed from said sun gear when said motor generator is operated and said ring gear is stationary.

4. The combination of electro-mechanical hybrid powertrain defined in claim 3, wherein said carrier assembly is responsive to the torque imposed thereon by said sun gear to be driven in a direction which will cause engagement of said self-energizing means in said brake means.

* * * * *